United States Patent [19]

Matsuoka et al.

[11] 4,314,177
[45] Feb. 2, 1982

[54] LOW-ENERGY-ELECTRON-EXCITING FLUORESCENT DISPLAY DEVICE

[75] Inventors: Tomizo Matsuoka, Neyagawa; Tsuneharu Nitta, Katano; Shigeru Hayakawa, Hirakata, all of Japan

[73] Assignee: Matsushita Electric Industrial Co., Ltd., Japan

[21] Appl. No.: 225,322

[22] Filed: Jan. 15, 1981

Related U.S. Application Data

[63] Continuation of Ser. No. 55,194, Jul. 2, 1979, abandoned.

[30] Foreign Application Priority Data

Jul. 7, 1978 [JP] Japan ................................. 53-83369

[51] Int. Cl.³ ........................................... C09K 11/465
[52] U.S. Cl. ............................... 313/497; 252/301.4 F
[58] Field of Search ................. 252/301.4F; 313/495, 313/496, 497

[56] References Cited

FOREIGN PATENT DOCUMENTS 51-71285  6/1976  Japan ........................... 252/301.4 F

OTHER PUBLICATIONS

Matsuoka et al., "J. Electrochem. Soc.," vol. 125, No. 1, pp. 102–106.

*Primary Examiner*—Jack Cooper
*Attorney, Agent, or Firm*—Wenderoth, Lind & Ponack

[57] ABSTRACT

A red emission fluorescent display device employing improved $SnO_2$:Eu phosphor as a low-energy-electron excitation phosphor. The phosphor is manufactured by the following steps:

An aqueous solution of a mixture of europium and at least one material selected from stannous halides and stannous sulfate is prepared. The amount of europium ion is adjusted so that the ratio thereof to tin ions ranges between $5 \times 10^{-2}$ and 10 atomic %. The solution is poured into and mixed with a hot aqueous solution including oxalic ions, while the mixed solution is being stirred, to form oxalate coprecipitates of tin and europium. After being dryed the coprecipitate is heated so as to be thermally decomposed and then is subjected to heat treatment at the temperature above that for the thermal decomposition, whereby europium ions are diffused into the stannic oxide matrix.

The device exhibits remarkably high luminescence intensity which is satisfactory for practical use.

1 Claim, 6 Drawing Figures

FIG. 2
FIG. 3
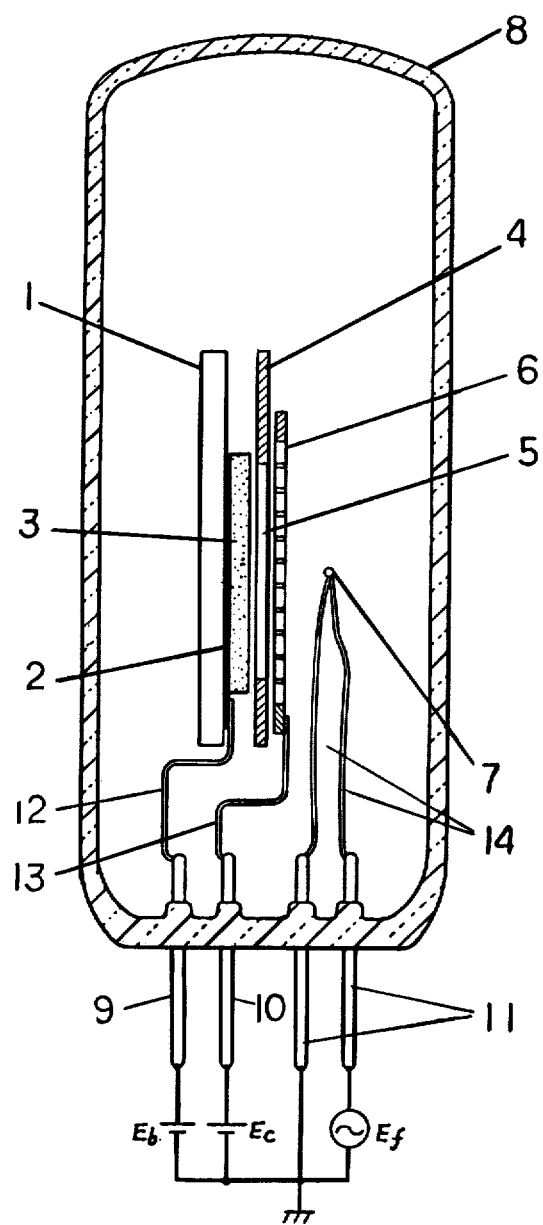
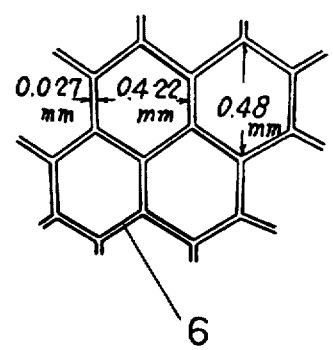

LOW-ENERGY-ELECTRON-EXCITING FLUORESCENT DISPLAY DEVICE

This is a continuation of Ser. No. 55,194, filed July 2, 1979, now abandoned.

BACKGROUND OF THE INVENTION

This invention relates to a fluorescent display device having a low energy electron excitation phosphor and more particularly pertains to such device in which $SnO_2:Eu$ is employed as the phosphor for emitting red fluorescent rays.

A fluorescent display device having a low energy electron excitation phosphor basically has the structure of a modified triode vacuum tube, in which the phosphor coated on an anode plate fluoresces due to bombardment of electrons emitted from a cathode heated at subluminous temperature. The electron bombardment is controlled by a grid.

Such device has the following features: Its power dissipation is quite low, being about one-half to two-thirds of a LED. And it has a simpler and more easily producible structure than the LED. Further it is superior to a liquid-crystal device because of self-glowing characteristics which makes the device visible in a dark place.

Therefore, the vacuum fluorescent device has flourished as a dot-matrix alphanumeric device which is assembled in, for example desktop calculators.

As the low energy electron excitation phosphor, only ZnO:Zn has been popular. It emits blue-green ray. However for enabling more complex displays, it has been desired to make available another-color-ray emitting phosphor.

$SnO_2:Eu$ phosphor was invented for such purpose and emits red rays having the spectrum shown in FIG. 1 when excited by electron beams or ultraviolet rays. This phosphor exhibits a dead voltage of 5 V which is as low as that of ZnO:Zn phosphor. Thus $SnO_2:Eu$ phosphor is the first red ray emitting and low energy electron excitation phosphor which is satisfactory in performance and reliability for commercial use.

The $SnO_2:Eu$ phosphor has hitherto been produced by the following process:

Mixed aqueous solution of stannous chloride and europium chloride is prepared and ammonia solution is added thereto until pH of the mixed solution becomes 8.5, thereby forming hydroxide coprecipitate. By drying and heat-treating the coprecipitate, $SnO_2:Eu$ phosphor is obtained. This hydroxide coprecipitate, however, has very small particle size of 0.01 µm and because of its large apparent specific volume due to such extremely small particle size, it is difficult to handle in the manufacturing process. This coprecipitate has a further disadvantage that it easily changes to $SnO_2$ in the drying step, resulting in the decrease of reaction activity in the following heat treatment. As the result of those disadvantages, the obtained phosphor exhibits unsatisfactory performance for the commercial use of the red emission fluorescent vacuum display device.

Another method is as follows:

Oxalate coprecipitate is made by rapidly mixing stannous chloride and europium chloride aqueous or alcohol mixed solution, with the aqueous solution including oxalic ions. The phosphor is obtained as the result of thermal decomposition of the coprecipitate. The oxalate coprecipitate has a dendrite-like particle configuration and thus, the resulting phosphor hardly has particle size more than 1.5 µm and does not emit a glow of satisfactory intensity. Further the such oxalate coprecipitate has a disadvantage, that it thermally decomposes so rapidly during the heat treatment, that there are yielded CO and $CO_2$ gas, resulting in the self-spouting phenomenon from a container.

SUMMARY OF THE INVENTION

It is an object of the present invention to provide a low-energy-electron-exciting fluorescent display device with red emission having improved high intensity.

According to one preferred embodiment of the invention, the fluorescent display device is composed of an anode coated with $SnO_2:Eu$ powder phosphor, a cathode for thermoelectronic emission source confronting said anode, a mesh grid located between said anode and said cathode, and a glass tube for sealing said components in vacuum, wherein the phosphor is manufactured by the following steps:

An aqueous solution of a mixture of europium and at least one material selected from stannous halides and stannous sulfate is prepared. The amount of europium is adjusted so that the ratio thereof to tin ions ranges between $5 \times 10^{-2}$ and 10 atomic%. The solution is poured into and mixed with the hot aqueous solution including oxalic ions, while the mixed solutions are being stirred, to form oxalate coprecipitates of tin and europium. After being dryed, the coprecipitates are heated so as to be thermally decomposed and then subjected to heat treatment at the temperature higher than that for the thermal decomposition, whereby europium ions are diffused into the stannic oxide matrix.

In this method, the oxalate coprecipitate of tin and europium has good crystallinity and so the obtained phosphor exhibits high luminescence intensity.

BRIEF DESCRIPTION OF THE DRAWINGS

FIG. 2 is a schematic view of a low-energy electron exciting fluorescent display device according to the invention;

FIG. 3 is a enlarged view of a control grid of the device illustrated in FIG. 2;

DETAILED DESCRIPTION OF THE INVENTION

Figure 1:
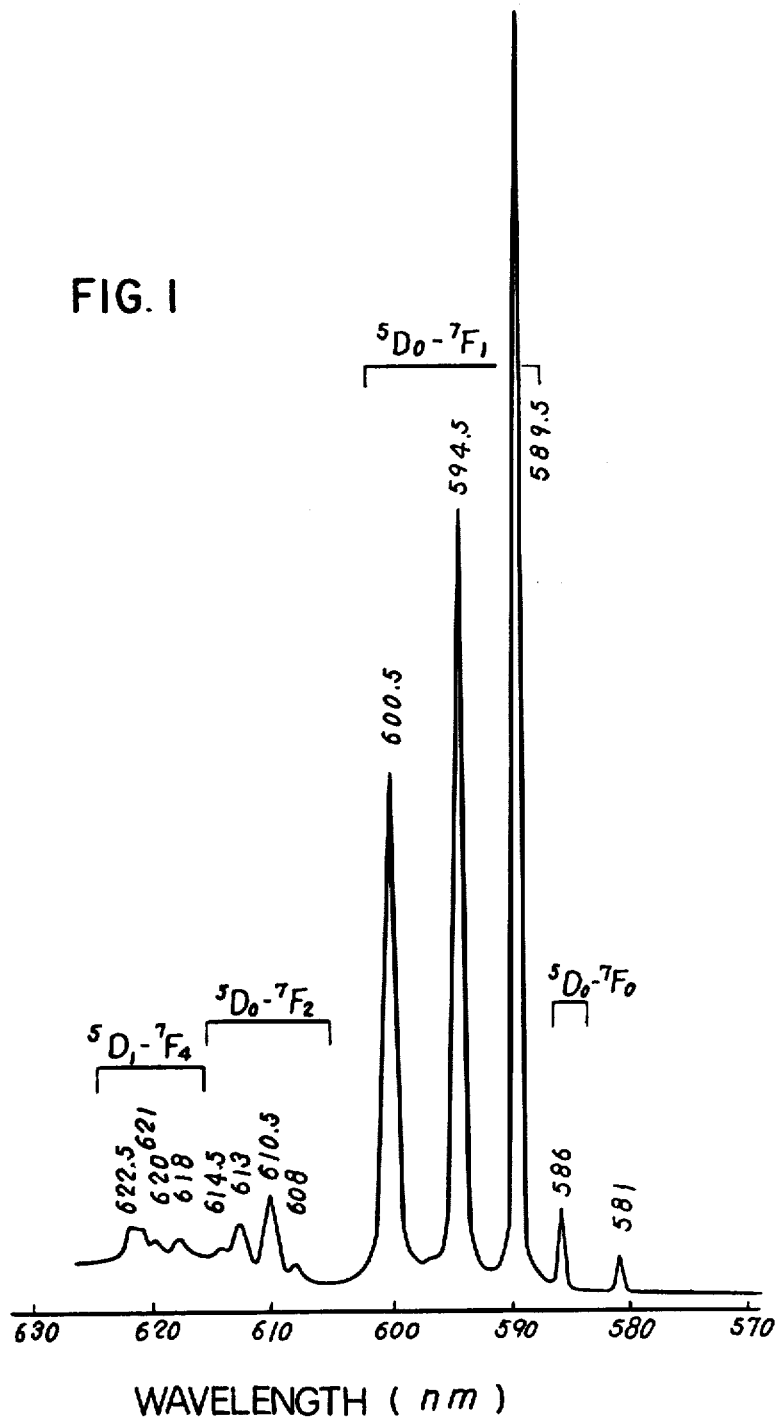
FIG. 1 is a graph showing the cathode luminescence spectrum of $SnO_2:Eu$ phosphor.

Referring to FIG. 2, numeral 1 represents a glass substrate with a transparent anode 2 deposited thereon. On the anode 2 is coated a phosphor layer 3 at 3 mg/cm². The phosphor layer 3 is deposited by sedimentation. A mica plate 4 having a 5×5 mm aparture is provided, confronting the phosphor layer 3 and being parallel to the substrate 1. A grid 6 is provided in parallel to the mica plate 4 and in front of the mica plate 4 on the opposite side of the substrate 1. This grid 6 has a honeycomb structure as shown in FIG. 3. As a thermoelectric emission source a hot cathode 7 with a wire structure is provided in front of the grid on the opposite side of the anode substrate 1. These components are sealed in vacuum by a glass tube 8. The anode 2, grid 6 and cathode 7 are connected to terminals 9, 10 and 11 by leads 12, 13 and 14, respectively. $E_b$, $E_c$ and $E_f$ represent electric sources. The substrate 1, mica plate 4, grid 6 and cathode 7 are supported in the usual manner, but the supporting structure is omitted from the illustration.

The phosphor layer 3 is of improved quality and the examples of its preparation are described hereinafter.

<Example 1>

Europium solutions were prepared by dissolving europium oxide into 10 cc of 12 normal HCl solution in the amounts such that the ratio of europium ions to tin ions, which were to be later added were $1 \times 10^{-2}$, $5 \times 10^{-2}$, $1 \times 10^{-1}$, 1, 10 and 15 atomic%. Each solution was diluted to 500 cc by adding deionized water and then 0.5 mole of $SnCl_2.2H_2O$ (112.8 gr) was added. The resultant solution was further diluted to 1,000 cc volume by deionized water. To prevent $SnCl_2$ from hydration, 10 gr of metallic tin was put in each solution.

On the other hand 1,000 cc aqueous solutions with 0.6 mole (85.3 gr) of ammonium oxalate $(NH_4)_2C_2O_4.H_2O$ dissolved were prepared and heated at the various temperature from 30° to 100° C.

Into the thus prepared ammonium oxalate aqueous solution, the above-mentioned tin and europium solutions were respectively poured at predetermined various pouring speeds, while the mixture was stirred, resulting in the formation of the tin and europium oxalate coprecipitates.

Figure 4:
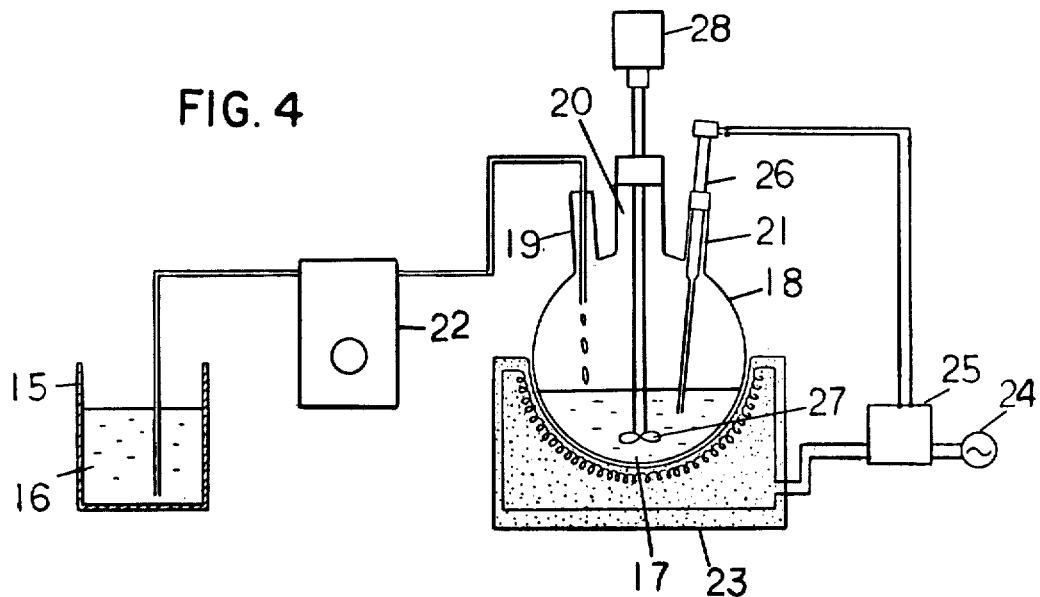
FIG. 4 is a schematic view of equipment for making tin and europium oxalate coprecipitate.

An apparatus illustrated in FIG. 4 was used for producing the oxalate coprecipitate. Referring to FIG. 4, numeral 15 represents a container of tin and europium mixed solution 16. Ammonium oxalate aqueous solution 17 is contained in a flask 18 having a volume of 3 liters and three inlets 19, 20 and 21. The solution 16 is transferred by a variable flow rate pump 22 to the flask 18 through the inlet 19. The flask 18 is heated by a mantle heater 23 which is supplied with electric current from a power source 24, the current supply being controlled by a relay 25. The relay 25 is coupled to a thermal sensor 26 which is inserted into the aqueous ammonium oxalate solution 17 through the inlet 21, and functions responsive to the output signal therefrom, whereby the solution 17 is kept at the constant temperature. Through the inlet 20, a stirrer 27 of polytetrafluoroethylene is inserted into the solution 17. The stirrer 27 is driven by a motor 28.

Figure 5:
FIGS. 5 and 6 are photographs showing particles of the tin and europium oxalate coprecipitate.

Thus obtained oxalate coprecipitates had an average particle size of about 20 μm and superior crystallinity as shown in FIG. 5. Such superior crystallinity contributes the high luminescence intensity and the remarkable diminishing of self-spouting phenomenon in the thermal decomposition process.

Figure 6:

On the other hand the crystallinity of the coprecipitate was poor in the cases where the pouring rate of tin and europium mixed solution was higher than 30 cc/min. The obtained coprecipitate had an average particle size of 25 × 50 μm and rod-like shape with numerous pores at the surface, as shown in FIG. 6. And sometimes it showed complete dendrite configuration. These rod-like oxalate particles are composed of aggregation of small particles, that is polycrystallites. The phosphors obtained from such particles exhibited low luminescence intensity. Further such particles showed the vigorous self-spouting phenomenon in the thermal decomposition process. The critical pouring rate for obtaining superior crystallinity was increased accordingly with the decrease of the concentration of the tin and europium mixed solution and the ammonium oxalate solution. Therefore, the pouring rate can be determined responsive to the concentration of the solutions. The lower pouring rate did not cause an unfavorable effect on the crystallinity.

The temperature of the ammonium oxalate solution should preferably be above 40° C. to make oxalate particles of superior crystallinity. When the temperature was lower than 40° C., the particles contained the aggregation of small particles whatever the concentrations of the solution were, resulting in the low luminescence intensity of the obtained phosphor and further the vigorous self-spouting phenomenon in the thermal decomposition process. The upper critical temperature of the ammonium oxalate solutions should be determined according to the practical aspects. It is difficult to heat the solution at a temperature higher than 100° C. and there is no merit to such temperature.

Thus obtained tin and europium oxalate coprecipitates were subjected to thermal decomposition at the temperature from 300° to 1,000° C. for 2 hours by using vitreous quartz containers. The containers were not covered with lids, to assist contact with ambient air. It was confirmed by differential thermal analysis and thermogravimetric analysis that the thermal decomposition took place rapidly at a temperature of from 300° to 400° C. Therefore it is practical to perform the thermal decomposition at above 400° C. Although the time required for completing the thermal decomposition is different according to the amount of the coprecipitate, a very long time is required when treated at lower temperatures than 400° C. When treated at 400° C. 0.5 mole of the coprecipitate was decomposed in 4 hours. It is a sufficient speed from a practical standpoint.

The temperature for the thermal decomposition had better not exceed 1,000° C. because of the refractoriness of the quartz container.

The use of vitreous quartz container is preferable because of the following reason: This thermal decomposition is accompanied by vigorous exothermic reactions due to conbustion of yielded CO gas and oxidation from stannous oxide to stannic oxide at a temperature from 300° to 400° C. Thermal shock by such exothermic reaction sometimes destroys a ceramic container.

The decomposed materials were subjected to high temperature heat treatment for diffusing europium into stannic oxide matrix. This treatment was performed with an alumina container having higher refractoriness than vitreous quartz and at the temperature above 1200° C. for 2 to 10 hours.

Thus the production of the phosphors was completed.

<EXAMPLE 2>

The phosphors were made by the same process as in Example 1 except that the concentrations of $SnCl_2.2H_2O$ and $(NH_4)_2C_2O_4.H_2O$ were 0.2 mole/l and 0.24 mole/l respectively.

<EXAMPLE 3>

The phosphors were made by the same process as in the Example 1 except that $SnBr_2$ or $SnSO_4$ was used instead of $SnCl_2.2H_2O$ or $H_2C_2O_4$ was used instead of $(NH_4)_2C_2O_4.H_2O$.

The phosphors produced by the above-mentioned example were examined for light emitting characteristics under low energy electron excitation. The measurement was performed by the use of the device illustrated in FIG. 2 and under the grid voltage $E_c$ of 18 V, the filament voltage $E_f$ of 3 V and the anode voltage $E_b$ of 10 V. The results are shown in the following Tables 1 and 2.

The data for the luminescence intensity in the Tables 1 and 2 are normalized to those at $I_b = 1.5$ mA/cm² since the thermoelectronic emission of the hot cathodes is different for differences devices and the luminescence intensity is proportional to excitation current density. In the column of the crystallinity of the oxalate coprecipitate in the Tables, the mark S represents a single crystal with superior crystallinity and P a polycrystallite with poor crystallinity.

higher than 70 f·L is obtained at $E_b$ of 30 V and $I_b$ of 5 mA/cm².

Samples No. 7 to 10 show the effect of the pouring rate of the tin and europium mixed solution on the ammonium oxalate solution. A high rate of pouring decreases the crystallinity of the oxalate coprecipitate as shown by sample No. 8. But if the concentrations of both the solutions are lowered, the oxalate coprecipitate with superior crystallinity is obtained at a high pouring rate such as shown by the sample No. 9. However the extremely rapid mixing causes poor results, even if the concentrations are low, as shown by the sample No. 10. The oxalate coprecipitate of the sample No. 10 is rod-like polycrystalline particle and the phosphor obtained

TABLE 1

| sample | concentration ingredient | mole/l | Eu addition (atomic %) | temperature at oxalate formation (°C.) | pouring rate (cc/min) | oxalate copricipitate particle size (μm) | crystallinity | thermal decomposition temperature (°C.) | time (hr) | diffusion temperature (°C.) | time (hr) | luminescence intensity of phosphor (f·L) |
|---|---|---|---|---|---|---|---|---|---|---|---|---|
| 1 | | | $1 \times 10^{-2}$ | 70 | 4.2 | 23 | S | 800 | 2 | 1350 | 2 | 20 |
| 2 | | | $5 \times 10^{-2}$ | 70 | 4.2 | 23 | S | 800 | 2 | 1350 | 2 | 25 |
| 3 | | | $1 \times 10^{-1}$ | 70 | 4.2 | 20 | S | 800 | 2 | 1350 | 2 | 28 |
| 4 | SnCl₂ (NH₄)₂C₂O₄ | 0.5 0.6 | 1 | 70 | 4.2 | 20 | S | 800 | 2 | 1350 | 2 | 30 |
| 5 | | | 10 | 70 | 4.2 | 17 | S | 800 | 2 | 1350 | 2 | 29 |
| 6 | | | 15 | 70 | 4.2 | 17 | S | 800 | 2 | 1350 | 2 | 22 |
| 7 | | | 1 | 70 | 20 | 15 | S | 800 | 2 | 1350 | 2 | 30 |
| 8 | | | 1 | 70 | 30 | 25 × 50 | P | 800 | 2 | 1350 | 2 | 18 |
| 9 | | | 1 | 70 | 30 | 18 | S | 800 | 2 | 1350 | 2 | 30 |
| 10 | SnCl₂ (NH₄)₂C₂O₄ | 0.2 0.24 | 1 | 70 | mix within 10 sec. | 20 × 40 | P | 800 | 2 | 1350 | 2 | 16 |
| 11 | | | 1 | 30 | 4.2 | 15 × 30 | P | 800 | 2 | 1350 | 2 | 16 |
| 12 | | | 1 | 40 | 4.2 | 15 | S | 800 | 2 | 1350 | 2 | 25 |
| 13 | SnCl₂ (NH₄)₂C₂O₄ | 0.5 0.6 | 1 | 100 | 4.2 | 25 | S | 800 | 2 | 1350 | 2 | 30 |
| 14 | | | 1 | 70 | 4.2 | 20 | S | 350 | 2 | 1350 | 2 | 22 |

TABLE 2

| sample | concentration ingredient | mole/l | Eu addition (atomic %) | temperature at oxalate formation (°C.) | pouring rate (cc/min) | oxalate copricipitate particle size (μm) | crystallinity | thermal decomposition temperature (°C.) | time (hr) | diffusion temperature (°C.) | time (hr) | luminescence intensity of phosphor (f·L) |
|---|---|---|---|---|---|---|---|---|---|---|---|---|
| 15 | | | 1 | 70 | 4.2 | 20 | S | 350 | 20 | 1350 | 2 | 26 |
| 16 | | | 1 | 70 | 4.2 | 20 | S | 400 | 4 | 1350 | 2 | 27 |
| 17 | SnCl₂ (NH₄)₂C₂O₄ | 0.5 0.6 | 1 | 70 | 4.2 | 20 | S | 1000 | 2 | 1350 | 2 | 30 |
| 18 | | | 1 | 70 | 4.2 | 20 | S | 800 | 2 | 1200 | 2 | 14 |
| 19 | | | 1 | 70 | 4.2 | 20 | S | 800 | 2 | 1200 | 10 | 20 |
| 20 | | | 1 | 70 | 4.2 | 20 | S | 800 | 2 | 1300 | 2 | 25 |
| 21 | | | 1 | 70 | 4.2 | 20 | S | 800 | 2 | 1500 | 2 | 32 |
| 22 | SnCl₂ H₂C₂O₄ | 0.5 0.6 | 1 | 70 | 4.2 | 22 | S | 800 | 2 | 1350 | 2 | 29 |
| 23 | SnBr₂ (NH₄)₂C₂O₄ | 0.5 0.6 | 1 | 70 | 4.2 | 23 | S | 800 | 2 | 1350 | 2 | 28 |
| 24 | SnSO₄ (NH₄)₂C₂O₄ | 0.5 0.6 | 1 | 70 | 4.2 | 17 | S | 800 | | 1350 | 2 | 28 |

Figure 7:
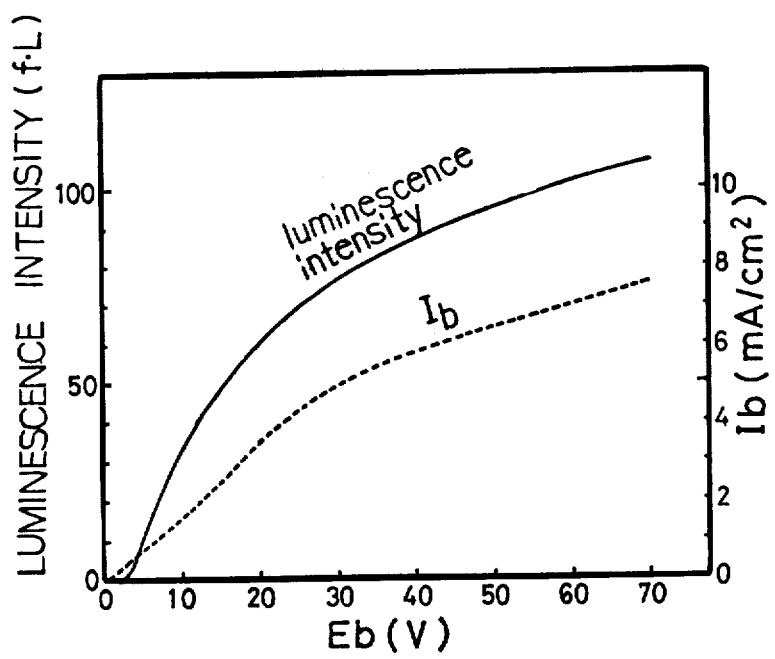
FIG. 7 is a graph showing the luminescence intensity-voltage curve of a representative phosphor employed in the invention.

Samples No. 1 to 6 show the effect of Eu on the luminescence intensity. When the addition of Eu ions ranges from $5 \times 10^{-2}$ to 10 atomic% to tin ions, the intensity above 25 f·L is obtained. This intensity is sufficient to identify the hue of the red emission in a character display device. In the Eu addition both below and above such range, the luminescence intensity was decreased. The luminescence intensity-anode voltage characteristics of the sample No. 4 is illustrated by the curve in FIG. 7. As is clear from this curve, an intensity after heat treatment thereof exhibits low luminescence intensity.

The samples No. 11 to 13 show the effect of the temperature on oxalate copricipitate formation. Temperatures above 40° C. contribute to superior crystallinity of the oxalate copricipitate and thus high luminescence intensity to the phosphor.

The samples No. 14 to 17 show the effect of the temperature on the thermal decomposition. The higher the decomposition temperature is, the higher the luminescence intensity of the phosphor is. It took 20 hours to achieve the intensity 25 f·L by decomposition temperature of 350° C.

The samples No. 18 to 21 show the effect of the heat treatment temperature on the europium diffusion into the $SnO_2$ matrix. There is shown a tendency that the higher the temperature, the higher the luminescence intensity of the phosphor. It is difficult to obtain an intensity above 25 f·L by the treatment at 1200° C. even if the treatment is performed for prolonged time. A temperature above 1300° C. enables the production of the phosphor having the luminescence intensity above 25 f·L. It is a matter of course that the temperature must be lower than melting point of $SnO_2$.

The samples No. 22 to 24 show cases wherein other ingredients and oxalate compounds than described above were used. In these cases it is found that the obtained phosphors also exhibit similar superior properties as the above-described cases.

What is claimed is:

1. A low-energy-electron-exciting fluorescent display device comprising an anode coated with $SnO_2$:Eu powder phosphor, a cathode as a thermoelectronic emission source confronting said anode, a mesh grid located between said anode and cathode, and a glass tube for sealing said components in vacuum, wherein the Eu content in said phosphor is such that the quantity of Eu based on the amount of Sn present is $5 \times 10^{-2}$ to 10 atomic % and the phosphor is prepared by the steps comprising:
   (a) preparing an aqueous solution of europium and at least one material selected from the group consisting of stannous halides and stannous sulfate, the ratio of the europium ions based on the amount of tin ions present being between $5 \times 10^{-2}$ and 10 atomic %;
   (b) pouring said solution into an aqueous solution comprising oxalic ions which is kept at a temperature between 40° and 100° C., while stirring the resultant mixed solution, thereby forming a single crystalline oxalate coprecipitate of tin and europium, the pouring rate being lower than the rate whereby the formed oxalate coprecipitate assumes rod-like polycrystalline particles having a dendrite-like configuration with numerous pores;
   (c) thermally decomposing said coprecipitate at a temperature between 400° and 1000° C. to a product comprising stannic oxide; and
   (d) subjecting said decomposed material to heat treatment at a temperature of from 1300° C. to below the melting temperature of stannic oxide, causing the europium ions to be diffused into the stannic oxide;
whereby the phosphor exhibits a luminescence intensity of more than 25 f·L when excited by 1.5 mA/cm² of electrons with an anode voltage of 10 V.

* * * * *